Patented Jan. 15, 1952

2,582,852

UNITED STATES PATENT OFFICE 2,582,852

METHOD OF MAKING CELLULAR GLASS OF LIGHT COLOR

Montgomery J. Shoemaker, Olean, N. Y., assignor to Pittsburgh Corning Corporation, Allegheny County, Pa., a corporation of Pennsylvania No Drawing. Application June 16, 1948,
Serial No. 33,445

11 Claims. (Cl. 106—40)

The present invention relates to a process of preparing cellular glass and it has particular relation to the preparation of cellular glass by the incorporation of suitable gassing agents in pulverulent form with powdered glass and heating the resultant mixture to sinter it and to generate bubbles of gas therein.

One object of the invention is to provide a cellulated glass which is of light color and adapted for use where the surface thereof is exposed to view.

A second object of the invention is to provide a form of cellulated glass which is free of objectionable sulphur-containing gases such as sulphur dioxide or the like.

A third object is to provide a simple and inexpensive method of preparing cellulated glass.

These and other objects of the invention will be apparent from consideration of the following specification and the appended claims.

It has heretofore been proposed to prepare a material suitable for use as a heat insulator for floats in life rafts and similar purposes by finely crushing glass cullet containing sulfates, admixing it with carbon black, powdered coal or other carbonaceous material and then heating the mixture to the sintering point of the glass. As a result of the heating operation, chemical reaction took place at the temperature approximating that of the sintering of the glass, between the carbon and the sulfates. Gases such as sulfur dioxide, carbon dioxide and other gases were generated in situ in the sintered mass and were entrapped as bubbles which imparted to the mass a cellular structure and resulted in a product of light weight and high resistance to the transmission of heat by conduction. The cell structures were in most cases sealed so that water, liquid or vapor and chemical fumes did not permeate the mass. The products were highly useful as a heat and fire resistant heat insulating material that would maintain its insulative value over long periods of time without appreciable diminution. Such process is disclosed in Patent 2,123,536.

The material as heretofore obtained, was of a black color due to the presence of free carbon in the sintered mass. For some uses where the surface of the material was exposed to view, this was objectionable. The cellulating action as previously stated also resulted in the production of sulfur-containing gases such as sulfur dioxide and under some conditions, hydrogen sulfide, which were objectionable as to smell. When the cellular material was cut to form portions of these gases were released from the ruptured cells or bubbles thus contaminating the atmosphere.

In accordance with the provisions of the present invention, the foregoing difficulties in the preparation of cellular glass are obviated by employment as a source of cullet of glass which is free or substantially free from sulfates. As gassing agents for such glass, ferric oxide as a source of oxygen and finely pulverulent carbon as a reducing agent may be employed. The ferric oxide, upon reduction by the carbonaceous material, provides carbon dioxide which acts as a bloating agent but is non-odorous. The ferric oxide also is capable of reacting with the carbon to such degree as practically to eliminate all free carbon, thus providing a cellulated product which is free from objectionable color.

In the preparation of a cellulated glass in accordance with the provisions of the present invention, various types of glass may be employed though usually the glass will include silica along with fluxes such as alkali metals (sodium and potassium) and alkali earth metals or their equivalents, e. g. calcium, magnesium, boron or mixtures thereof. Usually, the glass will include metal components expressed as oxides within the following ranges in percent by weight:

| Oxide | Percent |
| --- | --- |
| $SiO_2$ | 50–80 |
| $Al_2O_3$ | 0–10 |
| $CaO$ | 0–20 |
| $MgO$ | |
| $Na_2O$ | 2–15 |
| $K_2O$ | |
| $B_2O_3$ | 0–15 |
| $Fe_2O_3$ | 3–15 |

The total of the components in any specific glass, at least within the limits of experimental error will add up to 100%. Any one or two of the components, calcium oxide, magnesium oxide, boron trioxide, may be absent as indicated in the formula. However, it is to be understood that at least one component of the group or its equivalent will be present. The sum of one, two or three of these components in the batch will be within a percentage range of 5 to 40%. Ferric oxide preferably is a constituent of the glass but may be added to the pulverulent mixture. The glass may further include boron supplying constituents such as borax and/or aluminaceous silicates such as feldspar or the like. These latter ingredients are desirable if the glass is to be subjected to the action of moisture, since they tend further to increase the resistance of the cellular material containing them to gradual disintegration by water in liquid or vaporous form. The silica content of the glass may be supplied by sand.

The alkaline earth metal fluxes preferably will comprise calcium and/or magnesium in an appropriate form such as calcium and/or magnesium carbonate or oxide. A convenient material for the purpose comprises dolomite which is a mixture of calcium and magnesium carbonates.

Ferric oxide to supply oxygen by reduction with carbonaceous materials preferably is employed in substantial amount, e. g. 3 to 15% or more or less by weight of the glass batch. The ferric oxide may all be introduced into the glass batch employed as a source of glass or all or a portion, e. g. 25 to 75% of it may be incorporated and pulverized with the finished glass in the preparation of the pulverulent mixture for cellulation.

It is to be recognized that it is quite common to add many other components to glass batches. Such additions include compounds of manganese, cobalt, lead, barium, zinc, arsenic, antimony and many others. These additions are permissible but are not required in glasses employed in the practice of the present invention.

A glass batch or an equivalent batch appropriately melted down to a vitreous condition can be pulverized by grinding in a ball mill or other suitable apparatus. Preferably the grinding is conducted to such a stage as to obtain very finely divided glass, e. g. a powder 90% of which will pass a 300 mesh screen or even finer. There appears to be no lower limit on the average particle size other than those imposed by the economics of grinding. Most of the glass should pass a screen of 200 mesh. The glass in most cases will be of an average particle size of about .5 micron.

The reducing agent may conveniently comprise finely pulverulent carbon such as lamp black, gas black or carbon black or even finely powdered coal or coke. It may most readily be incorporated with the glass by adding it to the glass before or during the grinding operation.

It is best employed in a proportion approximately sufficient to reduce the available ferric oxide from the ferric to the ferrous state. A little more may be employed, as may also a little less than the theoretical amounts but excessive increase or decrease of the proportion is objectionable. Too much obviously will result in the presence of free carbon in the finished product, which if light color is desirable, cannot be tolerated. On the other hand, too small a proportion of carbon black will result in a ware which is not sufficiently cellulated. A proportion of pulverulent carbon within a range of about .15 to about 5% will be satisfactory for most purposes and the optimum in most instances will be within the approximate range of .17 to .5% based upon the total glass.

The batch which is to be cellulated is as uniformly mixed with the carbon black as is possible. This may be best accomplished by grinding the carbon and the cullet together starting with a coarse cullet and continuing to grind it until it is in its final state. It should be subjected to heating in molds of appropriate size and shape to form slabs or blocks or other bodies of a size and shape proper for the particular use to which the cellulated material is to be subjected. The molds preferably are closed in order to protect the mixture of pulverized glass and carbon black from undue oxidation by direct contact with the atmosphere or the flames within the furnace. It may be desirable to maintain a somewhat reducing condition in the atmosphere with the furnace wherein cellulation is conducted. The molds should be only partially filled, that is, sufficient space should be left to admit of expansion of the product to the desired degree as it sinters and bloats. This degree of expansion will depend somewhat upon the density desired in the finished product but in most instances the density can be expected to be within a range of about .1 to about .2 or .25. That is, the volume will be about 7 to 10 times that of a volume of conventional glass of equal weight.

The molds containing the mixture should be heated in a furnace to a temperature sufficient to sinter together and render the particles of glass somewhat plastic but insufficient fully to melt the glass. That is, the particles should cohere to provide a mass that can flow and puff up without cell rupture. But, it should not be so fluid as to permit conventional flow, or escape of gases or merger of bubbles to form large voids. This temperature will vary with the melting point of the glass but for most purposes will be within a range of about 1500° to 1800° F. and preferably is within the range of about 1600° F. to 1700° F. When properly heated, the particles of glass are sintered together to form a coherent impermeable mass of plastic nature. At the temperatures required to obtain these results, the pulverulent carbon and the ferric oxide react to release carbon dioxide and/or carbon monoxide gases which form minute bubbles in the viscous mass thus causing it to bloat up and expand to the desired degree. Usually a period of several hours, e. g. 2 to 5 hours dependent upon the thickness of the mixture which is heated will be required to obtain cellulation.

The cellulated products require very slow annealing because they are but poor conductors of heat and are also very fragile in structure because of their cellular character. Usually, about 15 to 20 or 25 hours for slabs or blocks of commercial size will be required in order to obtain adequate annealing and cooling of the ware. There is no upper limit as to time except those imposed by costs of the equipment required for very long periods.

The products obtained by application of the process are of closed cell structure, that is, nearly all of the cells are completely sealed so that gases and vapors cannot permeate to any substantial degree. They are of light color, e. g. a green and are well adapted for use where decoloration or good appearance is a desirable feature. The products as previously stated when cut or broken do not release gases of odoriferous nature. The products are, therefore, well adapted for use in thermal insulation, for floats such as floats on fish nets or as a light weight medium for packing life rafts and life preservers and for many other applications too numerous to mention.

The following constitutes a specific example of the batch formulation of glass suitable for crushing and admixing with carbon to provide a cellulatable material in accordance with the provisions of the present invention.

*Sulfate-Free Batch, Ext. II, percent*

| | |
|---|---|
| Sand | 45.0 |
| Soda ash | 3.4 |
| Dolomite | 9.9 |
| Custer spar | 17.2 |
| Borax | 10.8 |
| Pearl ash | 6.1 |
| Ferric oxide | 7.5 |

This mixture was fused to vitreous state then cooled and crushed to finely pulverulent condition with carbon black. .17% carbon black apparently constituted an optimum for the particular material. It will be apparent that small additions of other oxygen supplying agents such as potassium sulfate or antimony oxide or the like could be included in the mixture without departure from the spirit of the invention but are not required or even desirable for optimum results. Similarly, additional agents may be incorporated such as barium compounds, lead compounds or the like but in most instances are not essential. Substantial variations in the proportions of the various ingredients within reason could be tolerated.

It will be appreciated by those skilled in the art that numerous modifications may be made in the process as herein outlined without departure from the spirit of the invention or the scope of the appended claims.

I claim:

1. A process of preparing a light-colored cellulated glass which comprises heating a mixture of finely pulverized suitable glass containing 3 to 15% by weight of ferric oxide and pulverulent carbon to temperatures of 1500° F. to 1800° F. for sintering and cellulating the mixture.

2. A process of forming light-colored cellulated glass which comprises heating to the sintering and softening points of the glass a mixture of finely pulverized suitable glass substantially free of sulfates, ferric oxide in amounts of 3 to 15% by weight of the mixture, and pulverulent carbon in amounts of 0.15 to 5.0% by weight of the mixture.

3. In a process of forming cellulated glass suitable for use as an insulative material and being of light color, the steps comprising heating to the sintering and softening temperature a mixture of finely pulverized glass containing 3 to 15% of ferric oxide and carbon black in amounts of 0.17 to 0.2% of the mixture, the ferric oxide being in excess of the amount necessary to react with substantially all the carbon, then cooling and annealing the mixture.

4. A process of forming cellulated glass of light color, the steps of heating finely pulverized substantially sulfate free glass containing about 8% of ferric oxide and 0.17 to 0.2% of finely divided carbon black to a temperature of 1600° F. to 1700° F. sufficient to sinter and cellulate the mixture, then cooling and annealing the resultant cellulated body.

5. A process of preparing cellular glass, comprising the steps of, providing an intimate mixture of finely pulverized glass having about 3 to 15% of ferric oxide as a gas generating agent, and pulverulent carbon which is in an amount sufficiently less than that of ferric oxide so that there remains an excess of ferric oxide after cellulation, heating the mixture to a temperature sufficient to soften and cellulate the glass as the ferric oxide reacts with the carbon, and then tempering the product.

6. A process of preparing cellular glass having ferric oxide as the gas generating agent, comprising the steps of, preparing a mixture of finely pulverized, substantially sulfate-free glass having a ferric oxide content of 3% to 15% and pulverulent carbon in amounts of 0.15% to .5% by weight of the glass, the ratio of ferric oxide to carbon being in excess of the amount necessary to react with substantially all the carbon in securing the desired degree of cellulation, heating the mixture, in a non-oxidizing atmosphere, to a temperature of 1500° F. to 1800° F. to soften and cellulate the mixture, then annealing the product.

7. A process of preparing cellular glass having substantially uniform closed cells entrapping an odorless gas, consisting of the steps of, providing an intimate mixture of pulverulent, substantially sulfate-free glass containing ferric oxide about 7.5% by weight of the glass and pulverulent carbon black about 0.17% by weight of the glass, in which the ratio of ferric oxide to carbon is not less than an amount sufficient to react with substantially all the carbon, heating the mixture in a non-oxidizing atmosphere to a temperature of 1600° F. to soften and cellulate the glass, and then annealing the product.

8. A process as defined in claim 7 in which carbon black is in amounts of .17% to 0.2%, the ferric oxide is 8%, and the cellulating temperature is 1600° F. to 1700° F.

9. A process of preparing light colored cellulated glass, comprising the steps of, providing an intimate mixture of pulverulent glass and carbon in which the metal components of the glass, expressed as oxides, are within the following ranges in percentages by weight:

| Oxide | Percent |
|---|---|
| $SiO_2$ | 50-80 |
| $Al_2O_3$ | 0-10 |
| CaO | } 0-20 |
| MgO | |
| $Na_2O$ | } 2-15 |
| $K_2O$ | |
| $B_2O_3$ | 0-15 |
| $Fe_2O_3$ | 3-15 | in which some of the components, calcium oxide, magnesium oxide, and boron trioxide are within a percentage range of 5 to 40%, and the carbon is within 0.17% to .5% by weight of the glass, heating the mixture in a non-oxidizing atmosphere to a temperature of about 1500° F. to soften the glass into a coherent mass, raising the temperature to about 1700° F. to cellulate the mass, and then annealing the product.

10. A process as defined in claim 9, in which the raw batch formulation for the glass, in percentages by weight, are:

| | Per cent |
|---|---|
| Sand | 45.0 |
| Soda ash | 3.4 |
| Dolomite | 9.9 |
| Custer spar | 17.2 |
| Borax | 10.8 |
| Pearl ash | 6.1 |
| Ferric oxide | 7.5 |

11. A process as defined in claim 9, in which the ratio of ferric oxide to carbon is in excess of that necessary to react with substantially all the carbon to provide a product containing residual ferric oxide for the purpose of providing a green colored product.

MONTGOMERY J. SHOEMAKER.

REFERENCES CITED

The following references are of record in the file of this patent:

UNITED STATES PATENTS

| Number | Name | Date |
|---|---|---|
| 130,578 | Hartman | Aug. 20, 1872 |
| 2,123,536 | Long | July 12, 1938 |
| 2,257,681 | Haux | Sept. 30, 1941 |
| 2,337,672 | Long | Dec. 28, 1943 |
| 2,401,582 | Owen | June 4, 1946 |